UNITED STATES PATENT OFFICE.

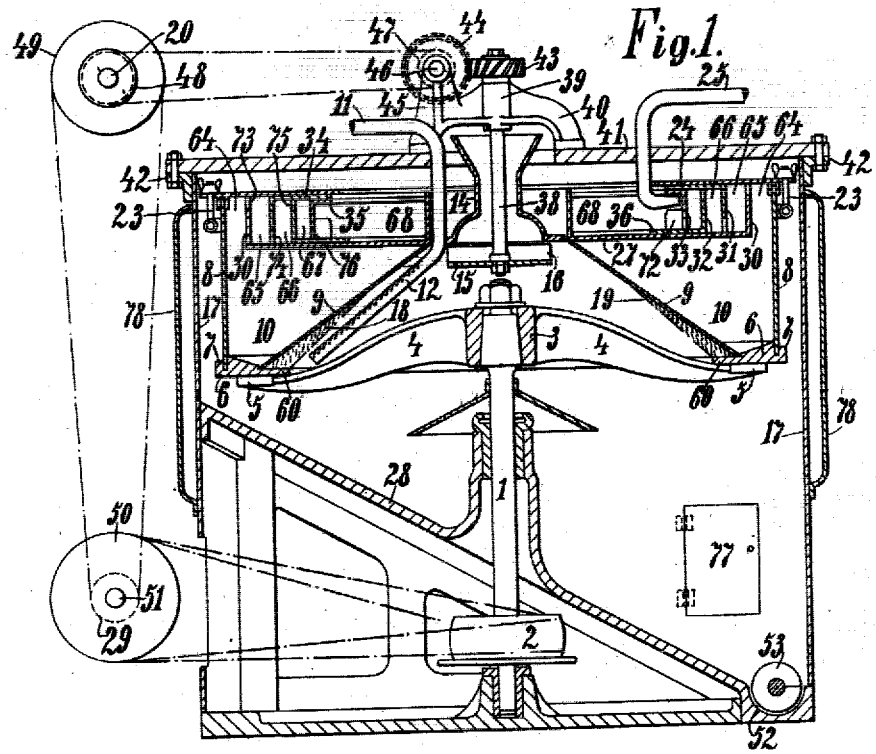

MAX GÜTTNER, OF CHEMNITZ, AND RICHARD BAEGER, OF EHRENBERG, NEAR ALTENBURG, GERMANY.

CENTRIFUGAL MACHINE.

No. 853,583.   Specification of Letters Patent.   Patented May 14, 1907.

Application filed July 6, 1905. Serial No. 268,296.

*To all whom it may concern:*

Be it known that we, MAX GÜTTNER and RICHARD BAEGER, subjects of the German Emperor, residing at Chemnitz and Ehrenberg, near Altenburg, in the Empire of Germany, respectively, have invented certain new and useful Improvements in Apparatus for Separating Wort from Mash, of which the following is a specification.

This invention relates to a new and useful improvement in apparatuses for separating the draff from wort by centrifugal action.

The invention aims primarily to provide a machine of the above type embodying in combination with the centrifugal apparatus a grading apparatus whereby the draff, albumenoids and other impurities will be successively separated from the wort in accordance with their specific gravities.

In the annexed drawing an apparatus serving for the purpose above referred to is shown.

Figure 1 is a vertical section of the machine and Fig. 2 a top-view thereof partially in horizontal section.

As to be seen from the drawing 1 is a shaft adapted to be rapidly revolved by means of the pulley 2. Keyed to said shaft is a hub 3 to which are fixed four or six downwardly curved flat arms 4, each of which terminates in a flat plate 5. The plates 5 support a thick annular part 6 provided with a rim 7, and to the said part 6 is fixed a non-perforated, preferably cylindrical part 8, a tight joint being made between the parts 6 and 8. A centrifugal chamber with a partly open bottom is thus formed, and this chamber surrounds a removable perforated wall 9 in the form of a truncated cone, the larger diameter of which is smaller than that of the non-perforated cylinder 8, so that an annular space 10 is left free between the latter and the wall 9. An essential feature of the apparatus consists in the fact that the perforated wall 9 forms with the horizontal plane an angle which is not greater than the angle of friction at which the returns are thrown against the said wall. To allow of forming, on the inner surface of the wall 9, a layer of returns which is infinitely thin at the upper part and increases in thickness toward the lower part, the ring 6 is provided with an inwardly projecting flange 60, the width of which is equal to the greatest thickness which it is proposed to give to the said layer.

The height of the perforated wall 9 is preferably somewhat less than the height of the wall 8, and fixed to the upper part of said wall 9 is a metal ring or disk 27, the outer diameter of which is such that a certain amount of space is left between the said disk and the wall 8. The aperture in the center of the disk 27 is of such size as to afford space for the distributer 15 16 and the pipe 12 hereinafter referred to. The disk 27 supports a series of rings 30, 31, 32 and 33, the ring 30 being preferably fixed to the disk whereas the rings 31, 32 and 33 simply rest upon the latter. The wall 8 is provided with vertical, radial plates 37, which preferably extend through the entire width of the space 10 and are prolonged upward in the chamber 64 to the annular cover 24. The rings 30, 31 32 and 33 are also provided with radial plates 69, 70, 71 and 72, which are located in staggered relation and are also staggered with respect to the plates 37, as shown in Fig. 2. By this means a series of separate chambers is formed the presence of which not only insures a steady flow of the passing wort but also prevents unintended displacement of the rings 31, 32 and 33. The ring 31 is provided at its upper part with an annular flange 34 against which the ring 32 and the flange 35 of the ring 33 abut. The ring 32 is provided with a flange 36 on which the ring 33 rests. The wall 8 and the rings 30, 31, 32 and 33 thus form four annular chambers 64, 65, 66 and 67, which communicate with each other by means of apertures 73, 74 and 75 arranged about the circumferences of the rings, alternately at the upper parts and the lower parts of the latter. The apertures 76 in the ring 33 also place the annular chamber 67 in communication with the chamber 68. The distributer 15 16, which is arranged below the mash-supply pipe or hopper 14, may be of any suitable type. In the form of construction illustrated it consists of a disk 15 provided with radial flanges 16. In some cases it may be desirable that the distributer should make a greater or less number of revolutions than said walls 8 and 9, in order that the mash discharged from the distributer shall not always be thrown against the same portions of the wall 9 but shall always strike different portions of the latter and thus be more uniformly distributed. In the form of construction illustrated in Figs. 1 and 2 the distributer 15 16 is fixed to a shaft 38 in order to allow of its being revolved more rapidly or more slowly than the wall 9. The bearing 39 of the shaft 38 is arranged in a bracket 40, the latter being fixed to a beam 41 which rests on and is fixed to, a flange 42 with which the outer jacket 17 is provided. A worm wheel 43 is fixed to the shaft 38 and meshes with a worm 44 fixed to a shaft 46, which has bearing in supports 45 which may be integral with the bracket 40. To the shaft 46 is fixed a pulley 47 which is connected, by means of a driving-cord or the like with a pulley 48 fixed to an intermediate shaft 20. To the latter is fixed a pulley 49 connected by means of a driving belt or the like with a pulley 29 fixed to a second intermediate shaft 51, and a pulley 50 mounted on the latter is connected, by means of a driving belt or the like with the pulley 2 on the shaft 1. It is obvious that by using pulleys of suitable diameters the distributer can be caused to revolve more rapidly or more slowly than the wall 9.

Within the jacket 17 there is arranged an inclined floor 28, down which the returns slide from the wall 9 to the trough 52, a screw conveyer 53 being arranged in the latter.

The jacket 17 is preferably so closed externally, that if desired the circulation of air due to the rotation of the walls 8 and 9 can be almost entirely prevented. If circulation of air is desired, air-apertures provided with suitable closing means can be arranged in the jacket 17.

The centrifugal apparatus operates as follows: The mash passes through the tube or hopper 14 on to the rapidly revolving disk 15 and is then acted on by the guides or vanes 16 and thrown against the inner surface of the revolving wall 9. As has been mentioned, the wall 9 forms, with the horizontal plane, an angle which is not greater than the angle of friction of the returns thrown against the wall 9. By the term angle of friction is meant the angle at which the returns strike the inner surface of the wall 9 when thrown from the distributer 15, 16. To secure the desired layer of returns upon the inner surface of the wall 9, thin at the top thereof and gradually increasing in thickness toward the lower part, this angle of friction should be equal to the angle formed by intersection of the plane of said distribution with said wall and may be influenced by the speed at which the distributer is rotated with relation to said wall and also by the condition of the mash. The returns therefore slide down the wall 9 until they reach the flange 60, by which they are prevented from leaving the centrifugal chamber. The action described continues until a layer of returns 18 is formed on the inner surface of the wall 9, the thickness of this layer being infinitely small at the upper part, but increasing toward the bottom until it is equal to the width of the flange 60. The heavy albuminous substances separated during the centrifuging process pass through the upper part of the wall 9, together with some of the wort. At the upper part of the wall 9 only slight resistance is offered to the passage of said albuminous substances, and the latter are thus afforded no opportunity of being retained by the returns in such a manner as to prevent the continued passage of the liquid constituents of the mash. That portion of the liquid which comes into contact with the lower part of the layer 18 contains no coagulated albuminoids, so that obstruction of the said lower part by albuminous substances cannot take place. The liquid which passes through the perforated wall 9 together with the albuminous bodies enters the space 10 and is thrown against the non-perforated wall 8 which revolves with the wall 9. This liquid more particularly enters the chambers formed by the plates 37 (Fig. 2.) When, in the course of the action described, the layer 18 has been formed, the inner surface of the latter makes with the horizontal plane an angle which corresponds with the angle of friction of the continuously supplied freshly arriving returns or mash. Under the influence of centrifugal force the latter slide down the inner conical surface 19 of the said layer and continuously discharge into said layer the wort with which they are mixed; centrifugal action causes this liquid to pass through the layer 18 and through the holes in the wall 9. In the chamber 10 the albuminoids which have passed through the perforated wall 9 with the wort are for the most part deposited by centrifugal action on the wall 8. The clear wort is compelled to pass upward from the chamber 10 into the chamber 64 and thence through the apertures 73 in the ring 30 to the chamber 65. In the latter the albuminoids of lower specific weight still contained in the wort are deposited by centrifugal action on the inner surface of the ring 30, and are prevented from passing upward by the cover 24. From the chamber 65 the wort passes through the apertures 74 in the ring 31 to the annular chamber 66 in which the action described with reference to the chamber 65 is repeated; that is to say the albuminoids and other impurities still contained in the wort are deposited by centrifugal action on the inner surface of the ring 31, the wort flowing upward through the apertures 75 in the ring 32 to the chamber 67. In the latter the finer impurities still contained in the wort are driven against the surface of the ring 32. Finally the wort passes through the apertures 76 into the chamber 68 surrounded by the ring 33 and is driven against the latter and discharged through the pipe 25. The returns forming the layer 18 can be edulcorated or washed by means of heated water supplied through the stationary pipes 11 and 12. As soon as the centrifugal treatment of the mash is completed, and the rotation of the shaft 1 is discontinued the returns forming the layer 18 descend by gravity and fall out of the centrifugal chamber. The bolts 23 can then be unfastened to allow of removing the cover 24 and lifting out the wall 9 with the metal ring 27, so that the wall 8 can be cleansed, and the particles of mash adhering to the said wall and to the ring 6 removed.

It is obvious that a stirring apparatus of the known type can be arranged below the wall 9 instead of the inclined floor 28. In this case the returns descending from the wall 9 can be mixed with warm water and suitably treated, so that the draining off or centrifuging of the second wort can be proceeded with.

As indicated in Fig. 1 the layer of returns need not begin at the top of the perforated wall, but may begin a certain distance below the top; this depends on the extent to which the angle of inclination of the perforated wall is less than the angle of friction of the returns as shown at 19 thrown against the said wall.

The jacket 17 which incloses the centrifugal apparatus is preferably provided with apertures or doors 77 adapted to be closed in such a manner, that the circulation of air through the apparatus can be regulated at will. The said jacket can also be surrounded by a heating jacket 78 in order to avoid, as far as possible, undesirable loss of heat.

Having now fully described our invention we declare that what we claim is:

1. In a centrifugal apparatus the combination of a rotatable annular perforated wall, a rotatable distributer arranged centrally in the space inclosed by said wall adjacent the upper part thereof, said wall forming with the plane of said distributer the angle of friction of the returns thrown against the same.

2. In a centrifugal apparatus the combination of a rotatable annular perforated wall, a rotatable distributer arranged centrally in the space inclosed by said wall and adjacent the upper part of the same, said wall forming with the plane of said distributer the angle of friction of the returns thrown against the same, and an inwardly projecting annular flange joined to said wall at the lower end thereof.

3. In a centrifugal apparatus, the combination of an annular perforated wall adapted to be rotated by means of a vertical shaft, a rotatable distributer arranged centrally in the space inclosed by said wall adjacent the upper part of the same, said wall forming with the plane of said distributer the angle of friction of the returns thrown against the same, and independent means for revolving said distributer at a speed differing from that of the said perforated wall.

4. In a centrifugal apparatus the combination of an annular perforated wall adapted to be rotated by means of a vertical shaft, a rotatable distributer arranged centrally in the space inclosed by said wall adjacent the upper part of the same, said wall forming with the plane of said distributer the angle of friction of the returns thrown against the same, a closed jacket tightly inclosing the apparatus and means for regulating the circulation of air through the apparatus.

5. In a centrifugal apparatus, the combination of an annular perforated wall adapted to be rotated by means of a vertical shaft, a rotatable distributer arranged centrally in the space inclosed by said wall adjacent the upper part of the same, said wall forming with the plane of said distributer the angle of friction of the returns thrown against the same, a closed jacket tightly inclosing the apparatus and means for heating said jacket.

6. In a centrifugal apparatus, the combination of a revoluble cylinder, a perforated annular wall arranged therein in spaced concentric relation and revoluble therewith, means for throwing returns against the inner surface of said wall in its revoluble movement, a plurality of angular concentric walls arranged between said first named wall and affording concentric chambers, said last named walls communicating with one another alternately adjacent to their upper and lower edges and a conductor leading from the innermost of said chambers thus formed.

7. In a centrifugal apparatus, the combination of a rotatable cone shaped downwardly flaring perforated wall, a rotatable distributer arranged centrally in the space inclosed by said wall adjacent the upper part thereof, said wall forming with the horizontal plane the angle of friction of the returns thrown against the same.

In testimony whereof we affix our signature in presence of two witnesses.

MAX GÜTTNER.
RICHARD BAEGER.

Witnesses:
MORRIS LIPMAN,
WALTER PRIGNITZ.